US010746346B1

(12) United States Patent
Fischer

(10) Patent No.: US 10,746,346 B1
(45) Date of Patent: Aug. 18, 2020

(54) QUICK RELEASE UNIVERSAL MOUNT

(71) Applicant: Douglas Fischer, Ottertail, MN (US)

(72) Inventor: Douglas Fischer, Ottertail, MN (US)

(*) Notice: Subject to any disclaimer, the term of this patent is extended or adjusted under 35 U.S.C. 154(b) by 0 days.

(21) Appl. No.: 16/257,567

(22) Filed: Jan. 25, 2019

(51) Int. Cl.
*F16M 11/04* (2006.01)
*F16B 2/10* (2006.01)
*F16M 13/02* (2006.01)

(52) U.S. Cl.
CPC .......... *F16M 11/041* (2013.01); *F16B 2/10* (2013.01); *F16M 13/02* (2013.01); *F16M 2200/021* (2013.01); *F16M 2200/08* (2013.01)

(58) Field of Classification Search
CPC .......... F16M 11/041; F16M 2200/021; F16M 2200/08; F16M 13/02; F16B 2/10
USPC ..... 248/176.1, 177.1, 187.1, 346.03, 346.06, 248/500, 501, 680, 681; 297/485, 452.59, 297/256.16
See application file for complete search history.

(56) References Cited

U.S. PATENT DOCUMENTS

| 1,490,608 A * | 4/1924 | Gilmour ............... B25B 1/103 269/104 |
| 3,151,910 A | 10/1964 | Larson |
| 3,493,201 A * | 2/1970 | Marran ................... F16M 7/00 248/678 |
| 3,642,320 A | 2/1972 | Ward |
| 3,851,916 A | 12/1974 | Quartullo |
| 4,086,676 A | 5/1978 | Arruza |
| 4,428,617 A | 1/1984 | Lawson |
| 4,766,838 A | 8/1988 | Johnson |
| 4,775,187 A | 10/1988 | Herr |
| 4,979,458 A | 12/1990 | Bouza |
| 5,044,299 A | 9/1991 | Frank |
| 5,197,406 A | 3/1993 | Rabal et al. |
| 5,297,849 A | 3/1994 | Chancellor |
| 5,511,757 A * | 4/1996 | Freelander ............. B65D 21/00 248/346.03 |
| 5,513,900 A * | 5/1996 | Iglesias .................. A47C 7/002 248/501 |
| 5,549,072 A | 8/1996 | Maloney |
| 5,795,017 A | 8/1998 | Zimmerman et al. |
| 5,992,804 A | 11/1999 | Johnson |
| 6,079,786 A | 6/2000 | Kirkland et al. |
| 6,127,259 A | 10/2000 | Shields et al. |
| 6,325,456 B1 | 12/2001 | Carnahan |
| 6,575,532 B2 | 6/2003 | Almerico |
| 6,808,231 B1 | 10/2004 | Hill |
| 7,980,192 B2 | 7/2011 | Flynn |
| 8,251,455 B1 | 8/2012 | Midkiff et al. |
| 8,459,736 B1 * | 6/2013 | Begley, Jr. ........... A47C 1/0265 297/217.7 |

(Continued)

*Primary Examiner* — Muhammad Ijaz
(74) *Attorney, Agent, or Firm* — Thomas J. Nikolai; DeWitt LLP

(57) ABSTRACT

Furniture and other items are temporarily, but securely, fixed to any of a variety of surfaces using a quick release universal mount. The quick release mount includes a top plate, at least two rotatable latch carrying axles, latches carried by each of said axles extending through openings in the top plate, and means for biasing or holding the latches carried by said axles in a latched condition. The quick release mount is coupled to a surface and the latches engage the item to be fixed to the surface. The quick release application has broad application, but is particularly useful for mounting items to docks, piers and boats.

19 Claims, 13 Drawing Sheets

(56) References Cited

U.S. PATENT DOCUMENTS

| | | | | |
|---|---|---|---|---|
| 8,544,809 B1* | 10/2013 | Laurita | ............... | A47C 3/18 |
| | | | | 248/346.01 |
| 10,059,407 B1* | 8/2018 | Ingalls | ............... | B63B 17/02 |
| 2004/0007651 A1* | 1/2004 | Williams | ......... | F16M 11/2014 |
| | | | | 248/346.06 |
| 2005/0183655 A1* | 8/2005 | Lewis | ............... | B63B 29/06 |
| | | | | 114/363 |

* cited by examiner

QUICK RELEASE UNIVERSAL MOUNT

CROSS-REFERENCED TO RELATED APPLICATIONS

Not applicable

STATEMENT REGARDING FEDERALLY SPONSORED RESEARCH OR DEVELOPMENT

Not applicable

BACKGROUND OF THE INVENTION

I. Field of the Invention

The present invention relates to furniture and other items typically used outdoors and stored indoors when not in use to prevent inordinate weathering. More specifically, the present invention concerns devices for securely mounting such furniture and other items to docks, boats, decks or other flat surfaces and having a quick release mechanism to permit easy removal for storage.

II. Discussion of the Prior Art

People like being on the water on boats and near the water on beaches, patios, decks and docks. Various types of furniture and equipment are used when recreating on or near the water.

Two shared problems are associated with such items and their use. First, being exposed to the natural elements such as wind, rain, sleet, snow and even sunlight causes damages to such items. This problem is particularly acute for items made of natural materials such as wood and of fabrics. Second, because wind speeds tend to be greater on or along open water than elsewhere, wind and other forces can cause such items to blow about. This is particularly problematic if wind or other forces cause such items to fall from a boat, pier or dock into the water.

Various mechanisms have been employed to secure furniture to a boat or to a dock. Examples are shown in U.S. Pat. No. 4,775,187, granted Oct. 4, 1988 to Richard W. Herr, U.S. Pat. No. 3,642,320, granted Feb. 15, 1972 to Milton K. Ward, U.S. Pat. No. 5,795,017, granted Aug. 18, 1998 to Matthew K. and Lee H. Zimmerman, U.S. Pat. No. 8,251,455, granted Aug. 28, 2012 to Thomas Midkiff et al, U.S. Pat. No. 6,217,259, granted Apr. 17, 2001 to Byron L. Godbersen, and U.S. Pat. No. 6,808,231, granted Oct. 26, 2004 to Marvin L. Hill. The mounting mechanisms employed in these patents have certain features in common. Each typically includes a top plate welded to one end of a vertical post. See, e.g., FIG. 3 of Ward. The top plate has a plurality of bolt holes and bolts passing through these holes are used to couple the plate to the seat of a chair. The other end of the vertical post is adapted to be received in a socket that is bolted to a floor of the boat, deck or dock. In the case of the Midkiff Patent, the post is clamped to a railing. In the case of Godbersen, the post is secured to or also serves as the support post of a dock. In the case of Hill, the post is coupled to other support members used to mount the chair to a trailer hitch of a truck or car. In none of these patents is the chair readily detachable from the plate or is the plate readily detachable from the post. This makes removal and storage of the chair when not in use more difficult and inconvenient.

Various folding lawn chairs are also known in the art. Examples include those shown in U.S. Pat. No. 5,326,152, granted Jul. 5, 1994 to Richard K. Baron, U.S. Pat. No. 5,873,624, granted Feb. 23, 1999 to Rick J. Simpson, and U.S. Pat. No. 4,536,026, granted Aug. 20, 1985 to Cornell. Such chairs offer various advantages in terms of transportation and storage but offer no means for securing them to a dock, pier, boat or other surface. As such, these chairs, and chairs like them, are highly susceptible to tipping over and falling into the water. Also, if a plate were bolted to the legs of such chairs, the chairs could no longer be folded for transport or storage without first removing the bolts and plate. Furthermore, any such plate would need to be specifically adapted to be fastened to a particular item.

Thus, there continues to be a real need for a mechanism having universal applications that will secure a piece of furniture or other item in place on a boat, dock, deck or other surface, and yet permits the piece of furniture or other item to be quickly and easily removed for storage.

SUMMARY OF THE INVENTION

The needs described above are met by providing a quick release universal mount. Such a mount includes a top plate having a top surface and a bottom surface. The top plate also includes a plurality of latch perforations. The latch perforations are arranged in two spaced-apart opposing rows. There is at least one latch perforation in each row.

First and second sets of mounting flanges extend from the bottom surface of the top plate. Each set of mounting flanges includes at least one mounting flange.

First and second latch carrying axles are mounted for rotation to the first and second sets of mounting flanges. More specifically, each of the latch carrying axles resides below the top plate and has a longitudinal axis, a first end coupled to the first set of mounting flanges and a second end coupled to the second set of mounting flanges. Each of the first and second latch carrying axles, when so mounted, is adapted to rotate about its longitudinal axis.

At least one first latch is coupled to the first latch carrying axle. The first latch is adapted to extend through a latch perforation of a first of said two spaced-apart opposing rows of latch perforations. This at least one first latch is adapted to move at least between a latch position and a release position by rotation of the first latch carrying axle about is longitudinal axis. This first latch may also be moved from either the latch position or release position to a stowed position in which the top of the first latch is flush with or beneath the top surface of the top plate.

In a similar fashion, at least one second latch is coupled to the second latch carrying axle. The at least one second latch is adapted to extend through a latch perforation of the second of the two spaced-apart opposing rows of latch perforations. The at least one second latch is also adapted to be moved between at least a latch position and a release position by rotation of the second latch carrying axle about the longitudinal axis of the second latch carrying axle. This second latch may also be moved from either the latch position or release position to a stowed position in which the top of the second latch is flush with or beneath the top surface of the top plate.

The quick release universal mount also includes a retainer assembly adapted to selectively retain said at least one first latch and said at least one second latch in their respective latch positions. The retainer assembly may comprise lock(s) or pin(s) adapted to prevent rotation of the latch carrying axles and the latches attached to the latch carrying axles. In other embodiments, the retainer assembly comprises a separate spring attachment flange coupled to each of the latch carrying axles and a spring extending between and coupled to these spring attachment flanges. The spring biases the latches toward their latch position (and stowed position). Rotation of an axle (and the resulting movement of latches attached to the axle from their latch position or stowed position) can only be accomplished if sufficient rotational force is applied to the axle to overcome the force supplied by the spring.

The universal spring release mount may be attached to a floor, wall or other surface in any number of ways. Bolts, brackets or clamps may be employed. In one embodiment, a post is coupled at one of its ends to and extends from the bottom surface of the top plate. The other end of the post is coupled to a sleeve or collar (collectively referred to herein as a "socket") that is coupled to the surface with which the universal mount is employed.

A wide variety of items can be coupled to a surface using the universal mount. Such items include, without limitation, chairs, tables, hammocks, gliders, grills, coolers, diving platforms, winches, and any of a variety of toys, tools and equipment. Such items must, of course, have attachment members that cooperate with the latches. These attachment members may be a part of the item or may be secured to the item to adapt the item for use with the universal mount of the present invention. To mount certain items, such as when mounting a hammock, multiple universal mounts are used in tandem.

BRIEF DESCRIPTION OF THE DRAWINGS

The foregoing features, objects and advantages of the invention will become apparent to those skilled in the art from the following detailed description of the preferred embodiment, especially when considered in conjunction with the accompanying drawings in which like numerals in the several views refer to corresponding parts.

DESCRIPTION OF THE PREFERRED EMBODIMENT

Figure 1:
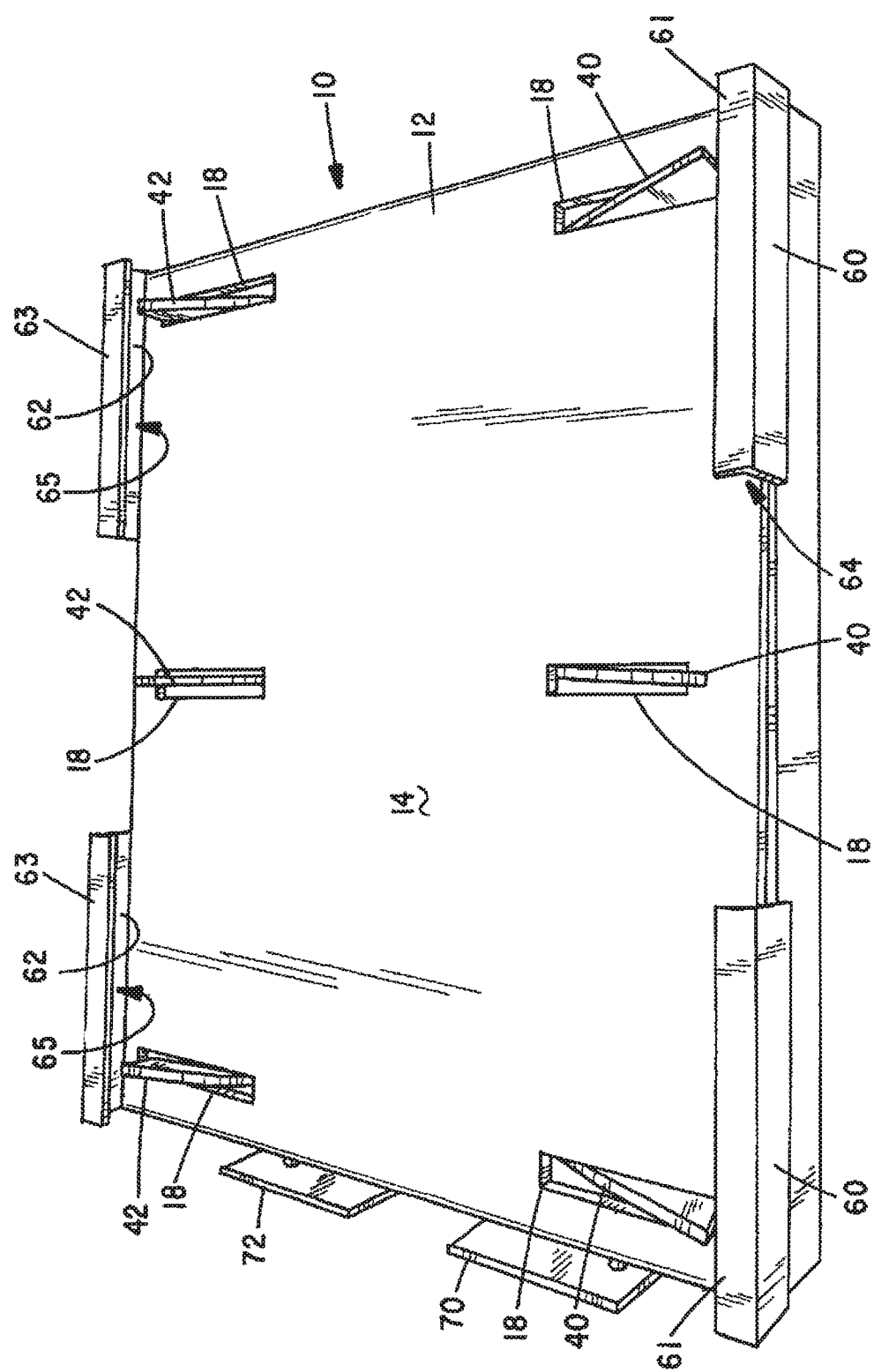
FIG. 1 is a perspective view showing the top of a first embodiment of a universal mount with the latches in the latch position.
Figure 2:
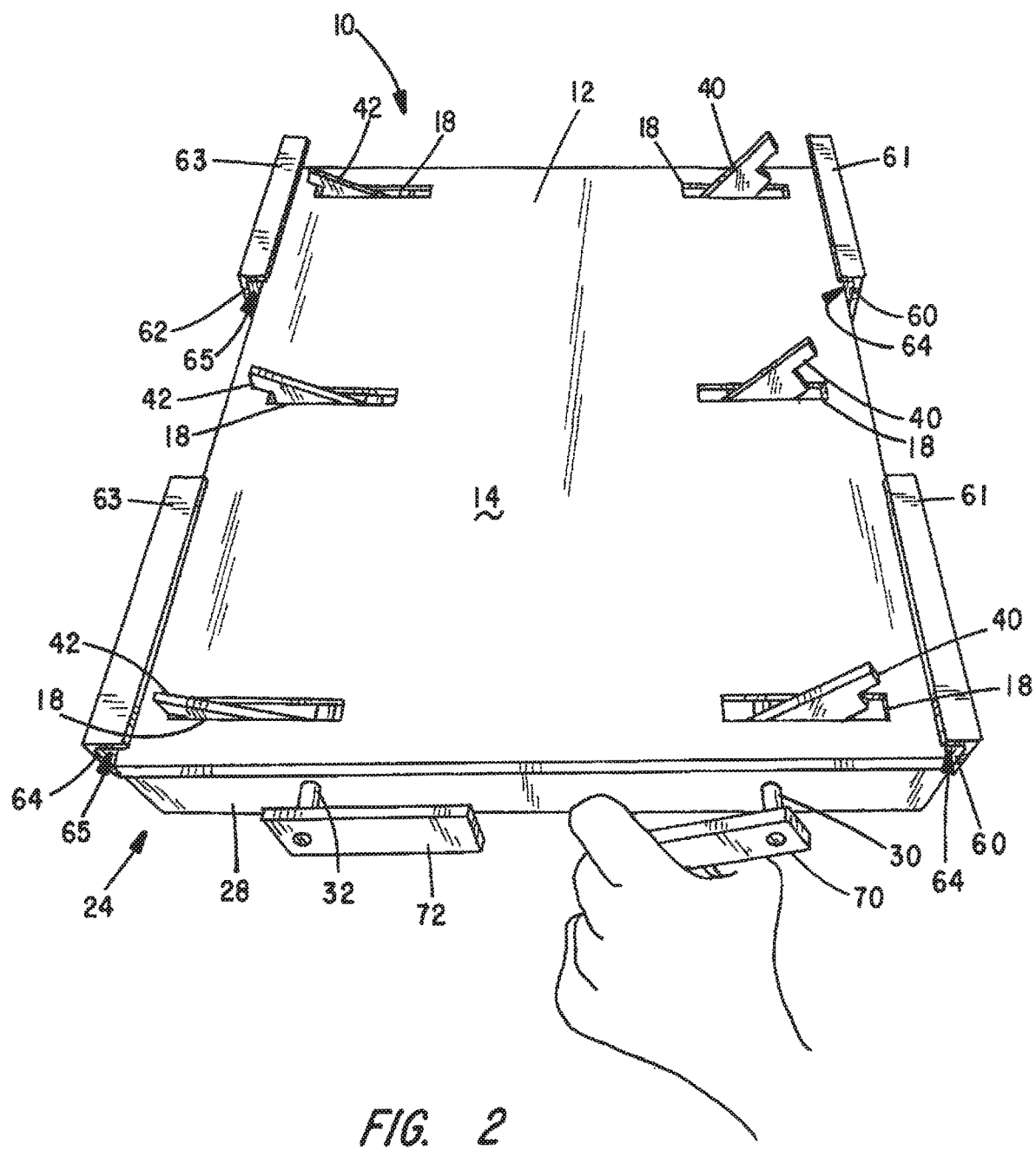
FIG. 2 is a perspective view showing the top of the embodiment of the universal mount of FIG. 1 with one of the two sets of latches in the release position.

This description of the preferred embodiments is intended to be read in connection with the accompanying drawings, which are to be considered part of the entire written description of this invention. In the description, relative terms such as "lower", "upper", "horizontal", "vertical", "above", "below", "up", "down", "top" and "bottom" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise.

Figure 3:
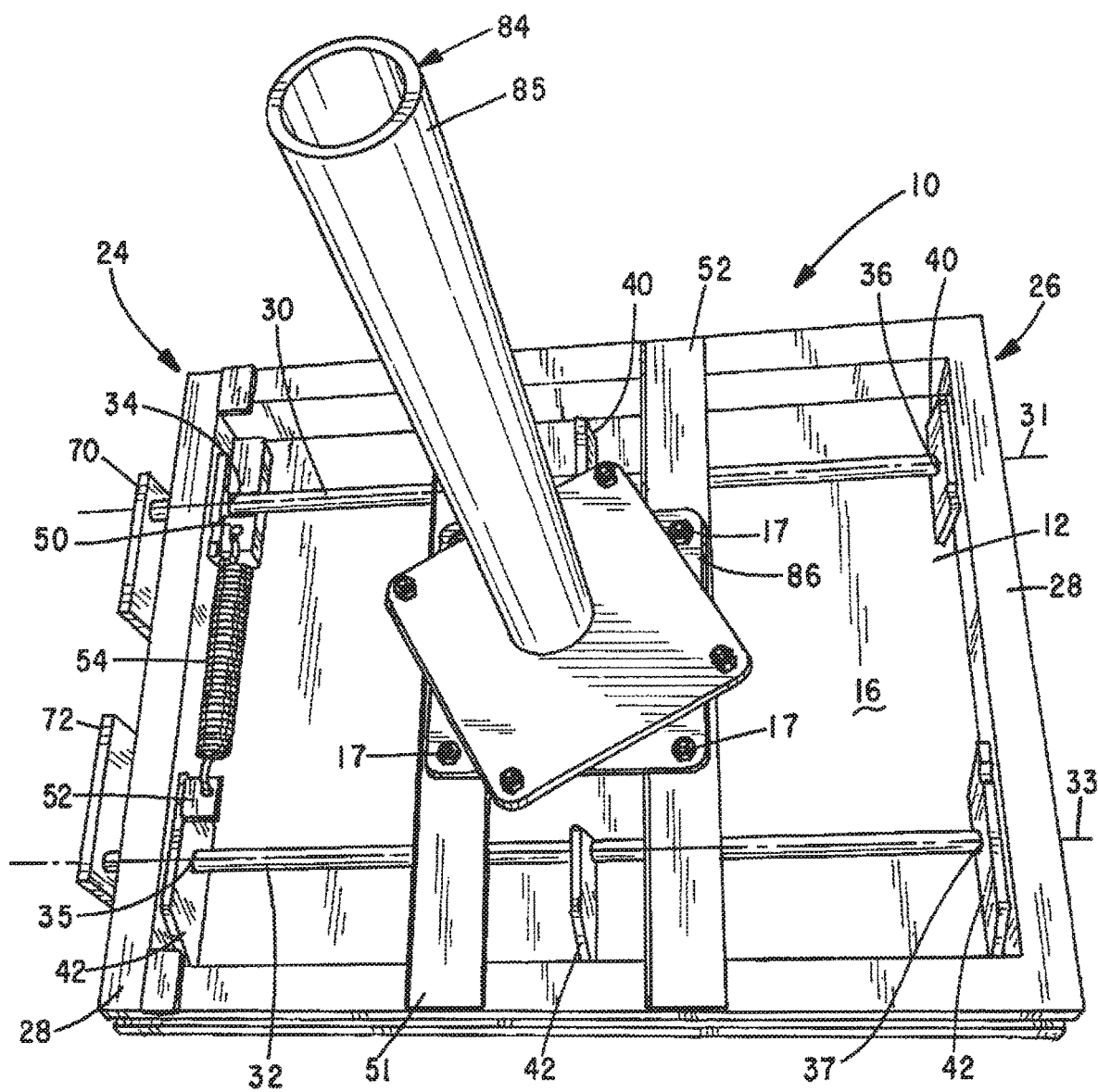
FIG. 3 is a perspective view showing the bottom of the embodiment of the universal mount shown in FIG. 1.
Figure 4:
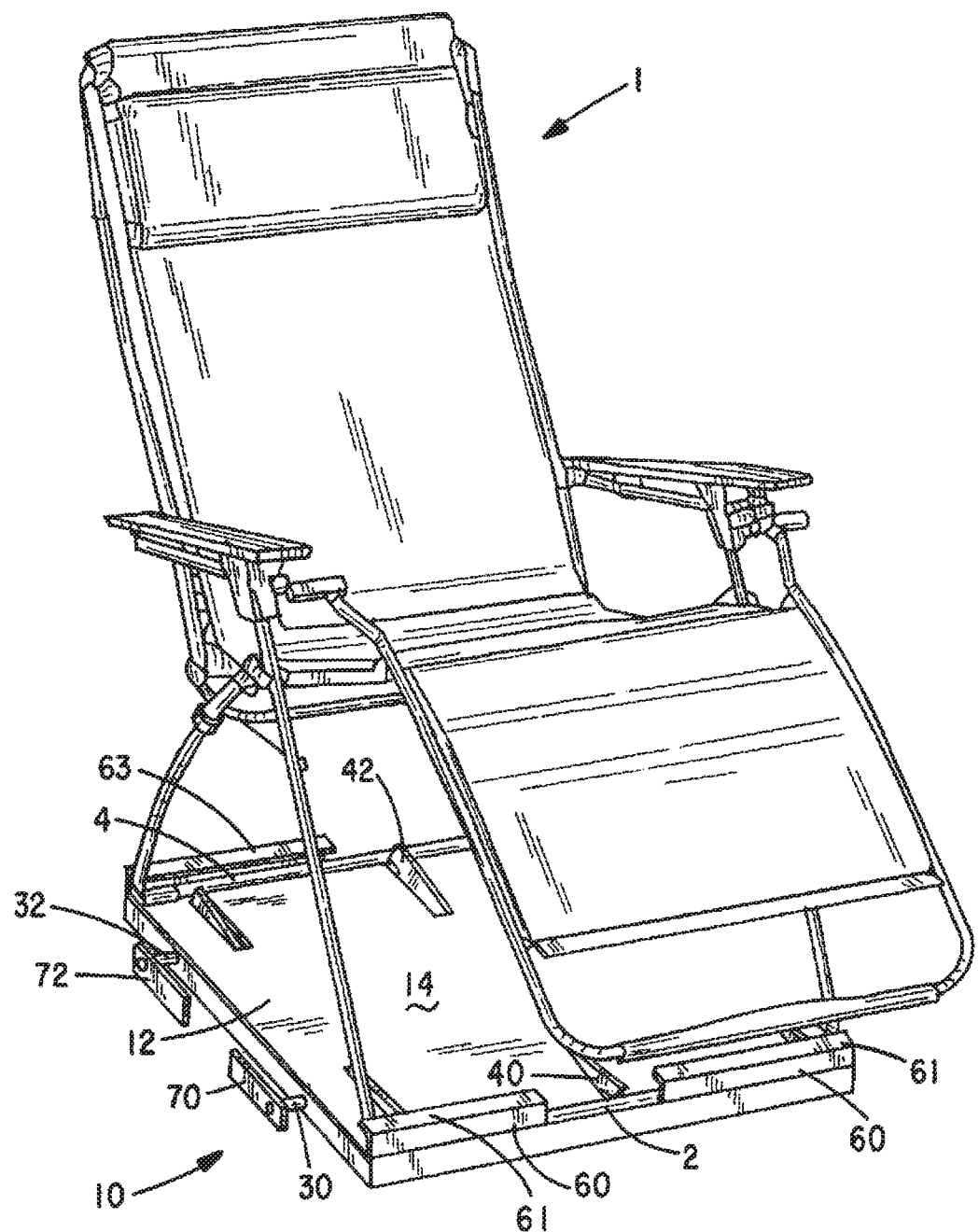
FIG. 4 is a perspective view showing a first folding lawn chair coupled to the universal mount of FIG. 1.
Figure 5:
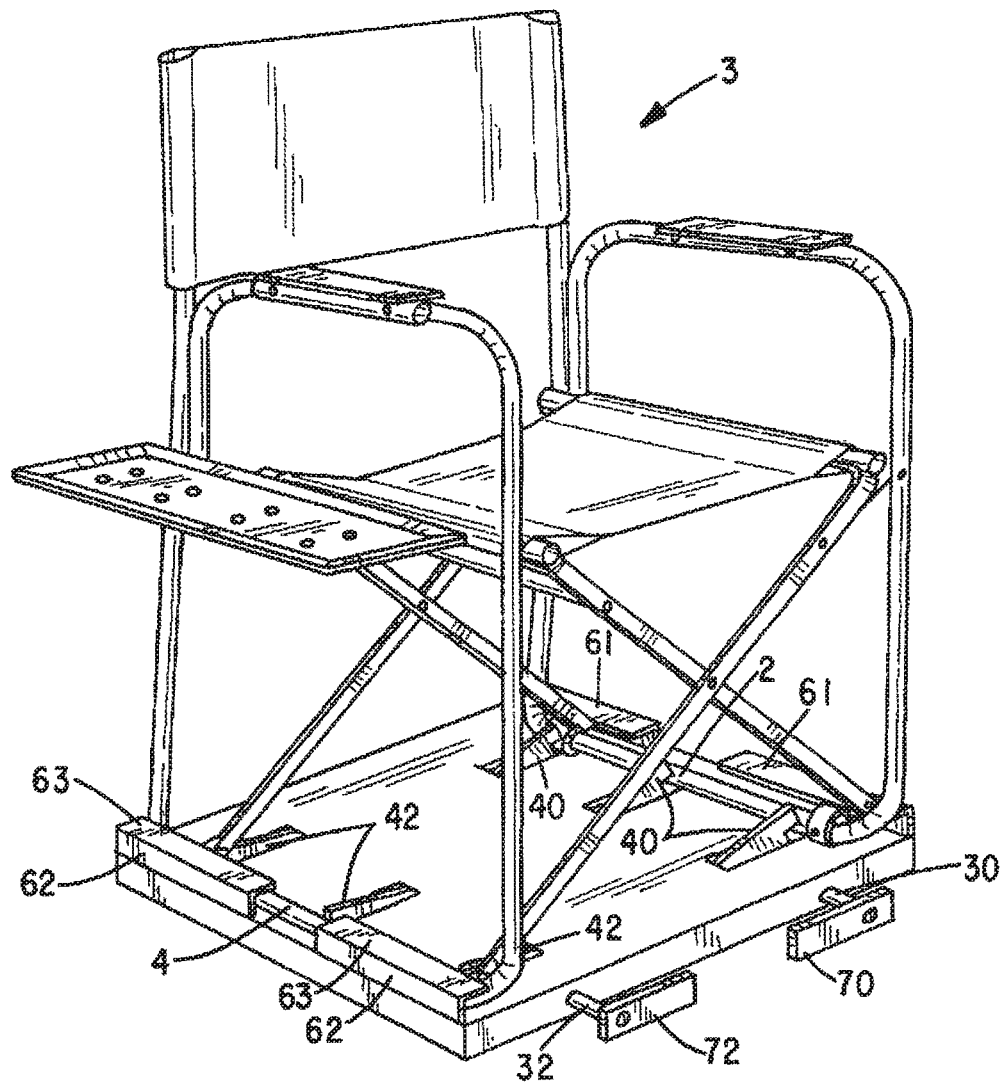
FIG. 5 is a perspective view showing a second folding lawn chair coupled to the universal mount of FIG. 1.
Figure 6:
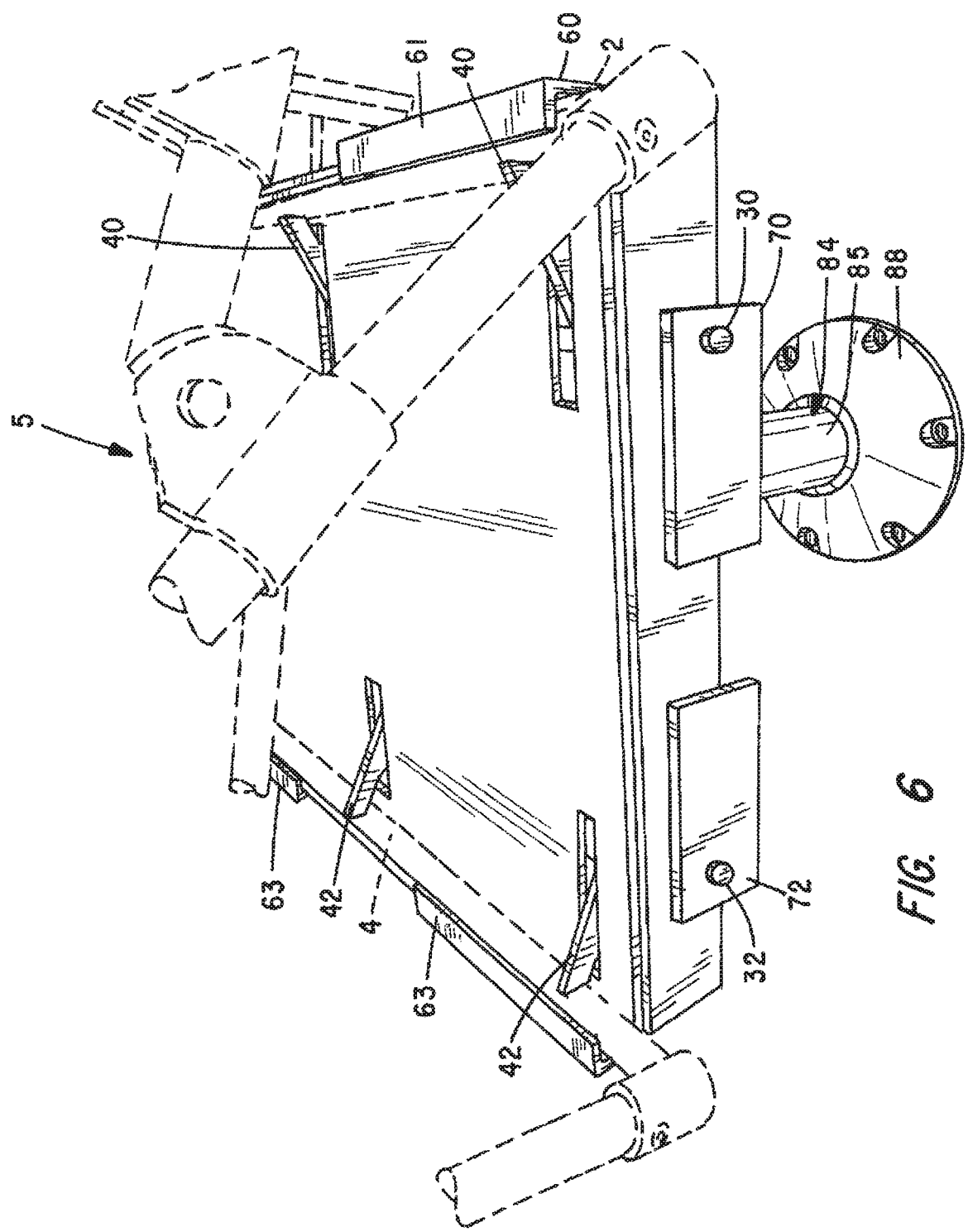
FIG. 6 is a perspective view showing a hammock stand coupled to the universal mount of FIG. 1.

A quick release universal mount 10 illustrated in FIGS. 1-6 may be employed to temporarily fasten an item such as the chairs 1 and 3 shown in FIGS. 4 and 5 or the hammock stand 5 shown in FIG. 6. The mount 10 comprises a top plate 12. As shown, top plate 12 is rectangular, but top plates having other shapes may be employed without deviating from the invention. The top plate 12 has a top surface 14 and a bottom surface 16. The top plate 12 further comprises a plurality of latch perforations 18. The latch perforations are arranged in two rows. As shown in FIGS. 1-6, each row has three such latch perforations 18. A larger number or smaller number of latch perforations 18 may be employed in each row. However, each row must have at least one latch perforation 18.

As best shown in FIG. 3, the quick release universal mount includes two sets 24 and 26 of mounting flanges 28. Each set 24 and 26 includes at least one mounting flange 28 as shown. A greater number may be employed without deviating from the invention. The two sets 24 and 26 of the mounting flanges 28 are typically aligned parallel to each other and spaced apart from each other. The mounting flanges 28 extend generally perpendicularly and downwardly from the bottom surface 16 of the top plate 12.

As shown, the quick release universal mount also includes two latch carrying axles 30 and 32. The latch carrying axles 30 and 32 each have a longitudinal axis 31/33, first ends 34/35 and second ends 36/37. The first end 34 of axle 30 is coupled to a mounting flange 28 of the first set 24 and the second end 36 of axle 30 is coupled to a mounting flange 28 of the second set 26. The mounting mechanisms employed permit the axle 30 to rotate about its longitudinal axis 31. Latch carrying axle 32 is mounted at its ends 35 and 37 in an identical fashion to mounting flanges 28 of the first set 24 and the second set 26 of the mounting flanges 28. As such, latch carrying axle 32 can rotate about its longitudinal axis 33.

Fixedly attached (i.e., coupled) to latch carrying axle 30 is at least one latch 40. Three such latches 40 are shown in FIGS. 1-6. Fixedly attached to latch carrying axle 32 is at least one latch 42. Again, three such latches 42 are shown in these drawings. The latches 40 are adapted to extend through the latch perforations 18 of each row of the latch perforations. The latches 40 attached to axle 30 move from the latch position shown in FIGS. 1 and 4-6 to the release position shown in FIG. 2 when the latch carrying axle 30 is rotated in a first direction. The latches 40 attached to axle 30 move from the release position shown in FIG. 2 to the latch position shown in FIGS. 1 and 4-6 when the latch carrying axle 30 is rotated in a second direction opposite the first direction. The latches 42 move between a latch position and a release position in an identical fashion as the latch carrying axle 32 is rotated. When the mount is not in use, the latch carrying axles 30 and 32 may be further rotated until the latches 40 and 42 are in the stowed position shown in FIG. 14. The tops of the latches 40 and 42 are flush with or beneath the top surface 14 of top plate 12 when in the stowed position.

As shown in FIG. 3, a first spring attachment flange 50 is coupled to latch carrying axle 30 and a second spring attachment flange 52 is coupled to latch carrying axle 32. A spring 54 extends between sprint attachment flanges 50 and 52. The spring 54 serves to bias the latches 40 and 42 toward their latch positions and hold the latches 40 and 42 in their latch positions. The latches 40 and 42 will only move from the latch position to the release position if enough rotational force is applied to the axle 30 or 32 to overcome the force applied by spring 54. Retaining pin(s) such as that shown in FIG. 13 or even padlock(s) such as that shown in FIG. 12 may be employed in addition to, or instead of, the spring 54 to prevent the latches 40 and 42 from inadvertently moving from the latch position to the release position.

Figure 12:
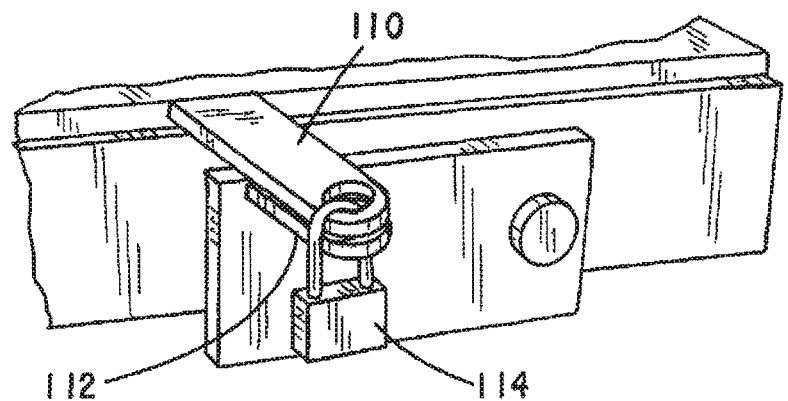
FIG. 12 shows a lock arrangement that may be employed with any of the foregoing embodiments of the universal mount.
Figure 13:
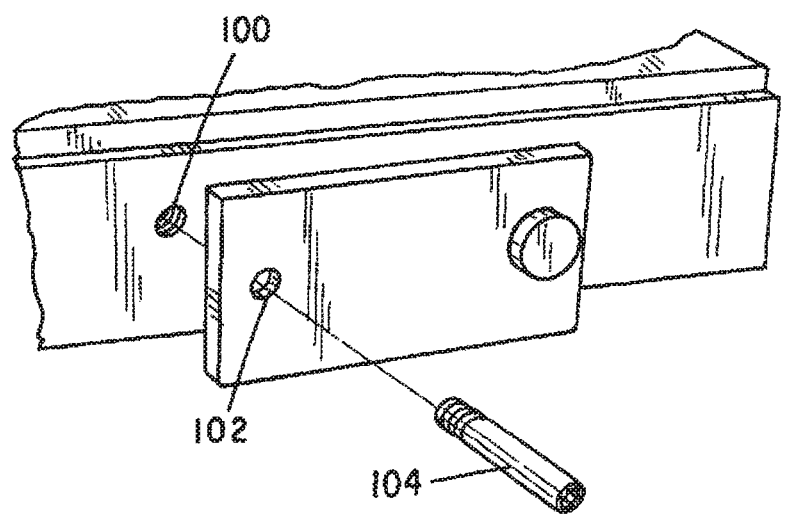
FIG. 13 shows a second lock arrangement that may be employed with any of the foregoing embodiments of the universal mount.

The locks, e.g., the locking pins 104 and the padlocks 114 may be mounted in a variety of ways. Two examples are shown in FIGS. 12 and 13. FIG. 12 shows a pair of locking flanges 110 and 112 extending parallel to each other. Locking flanges 110 and 112 have holes that are adapted to be aligned with each other. When so aligned, the shackle of a padlock 114 may be passed through these holes so that the padlock secures the two locking flanges together. As shown, locking flange 112 is mounted to a handle used to turn one of the axles and locking flange 110 is mounted to the top plate. A hinge (not shown) may be used to mount locking flange 110 to the top plate so that the locking flange may be rotated back over the top plate when the lock 114 is not present to permit movement of the handle.

FIG. 13 shows a threaded hole 100 in mounting flange 28 and another hole 102 extending through the handle. When the latches associated with the axle attached to the handle are in the latch position, holes 100 and 102 are aligned with each other. Pin 104, which has a threaded end and is longer than the distance between the mounting flange and the handle, is also shown. When the holes 100 and 102 are so aligned, the threaded end of pin 104 may be inserted through hole 102 and screwed into threaded hole 100 to lock the handle, axle and latches attached to the axle in the latch position. These elements remain locked until the pin is removed.

Figure 14:
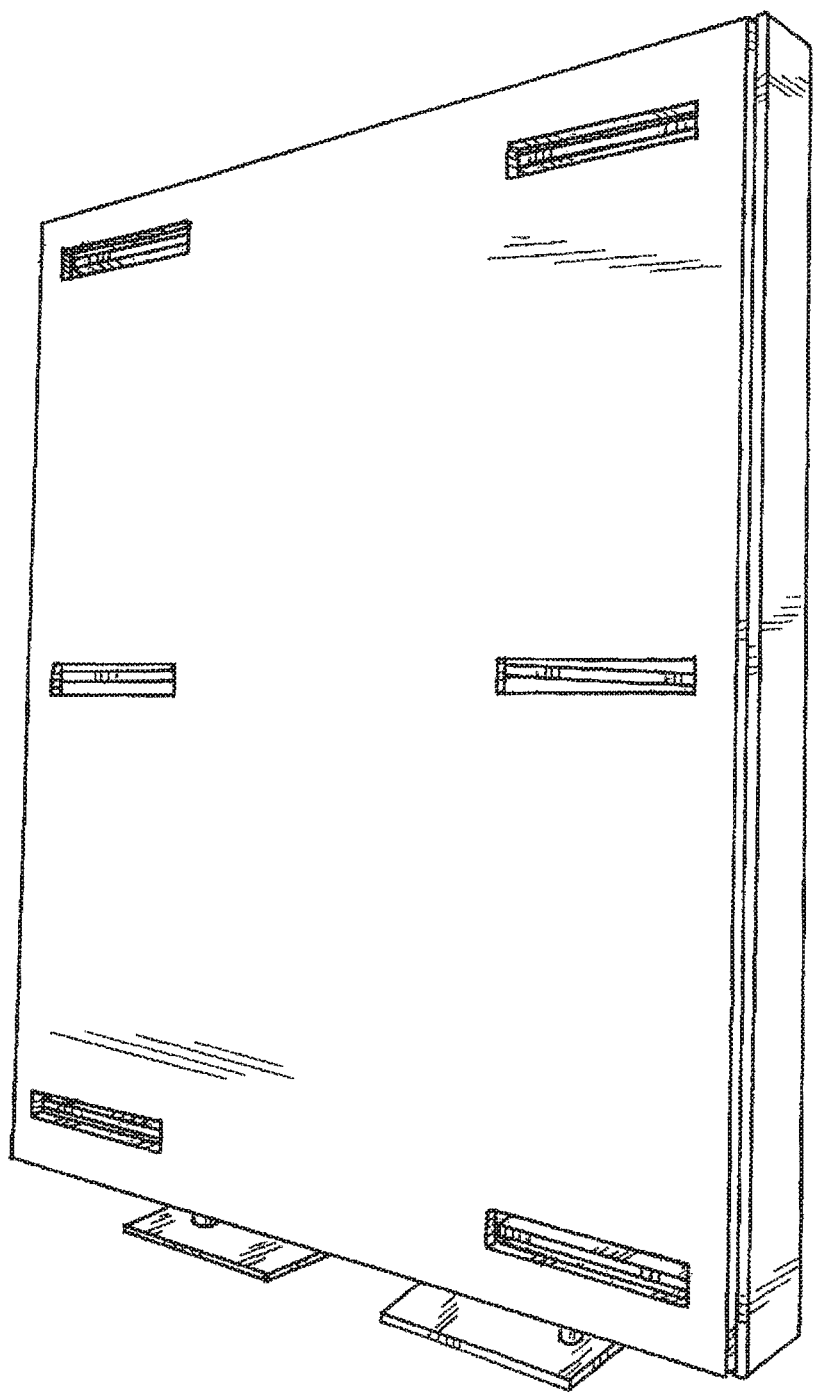
FIG. 14 is a perspective view of the top of the universal mount of FIGS. 7 and 8 with the latches in their stowed position.

The spring 54 also serves to bias the latches 40/42 into a stowed position shown in FIG. 14 when no item is mounted using the universal mount 10. In the stowed position, the tops of latches 40/42 are either flush with or slightly below the top surface 14 of top plate 12. The bottoms of the latches 40/42 are flush with or slightly above the bottoms of the mounting flanges 28 when in the stowed position. This makes a plurality of the universal mounts 10 easier to stack for storage and transport purposes.

In the embodiment shown in FIGS. 1-6, the quick release universal mount 10 also includes walls 60 and 62 extending upwardly from the top surface 14 of the top plate 12 adjacent the rows of latches 40/42. Walls 60 and 62 terminate in an inwardly extending roof 61/63. The top surface 14 of plate 12, the walls 60/62 and the roofs 61/63 cooperate to form pockets 64/65. These pockets 64/65 are adapted to receive braces 2/4 of the chairs, hammock stands, or other devices secured in place using the universal mount. Such braces 2 and 3 are shown in pockets 64/65 in FIG. 4-6. When the braces are so positioned, the latches 40/42 serve to retain the braces 2/4 in the pockets 64/65 when the latches 40/42 are in the latch position. The braces can be removed from pockets 64/65 after the latches 40/42 have been moved to the release position.

Figure 7:
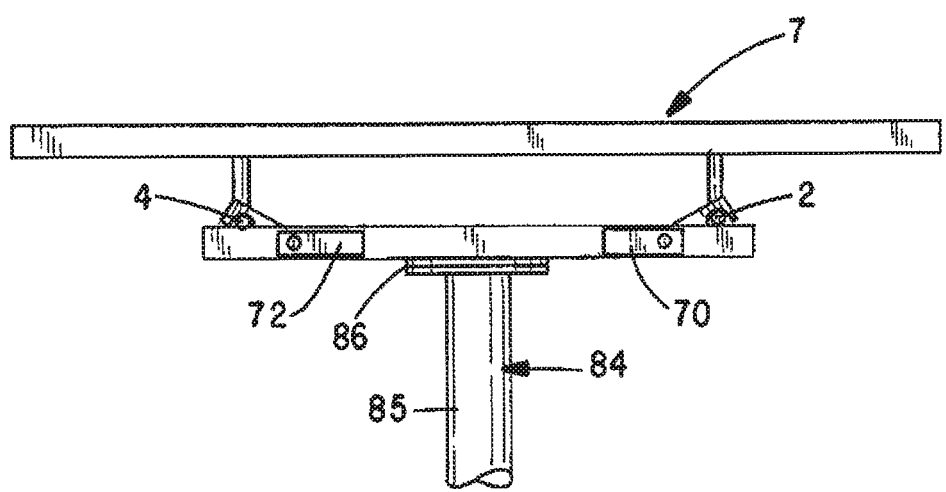
FIG. 7 is a side view showing a table top attached to an alternative embodiment of the universal mount.
Figure 8:
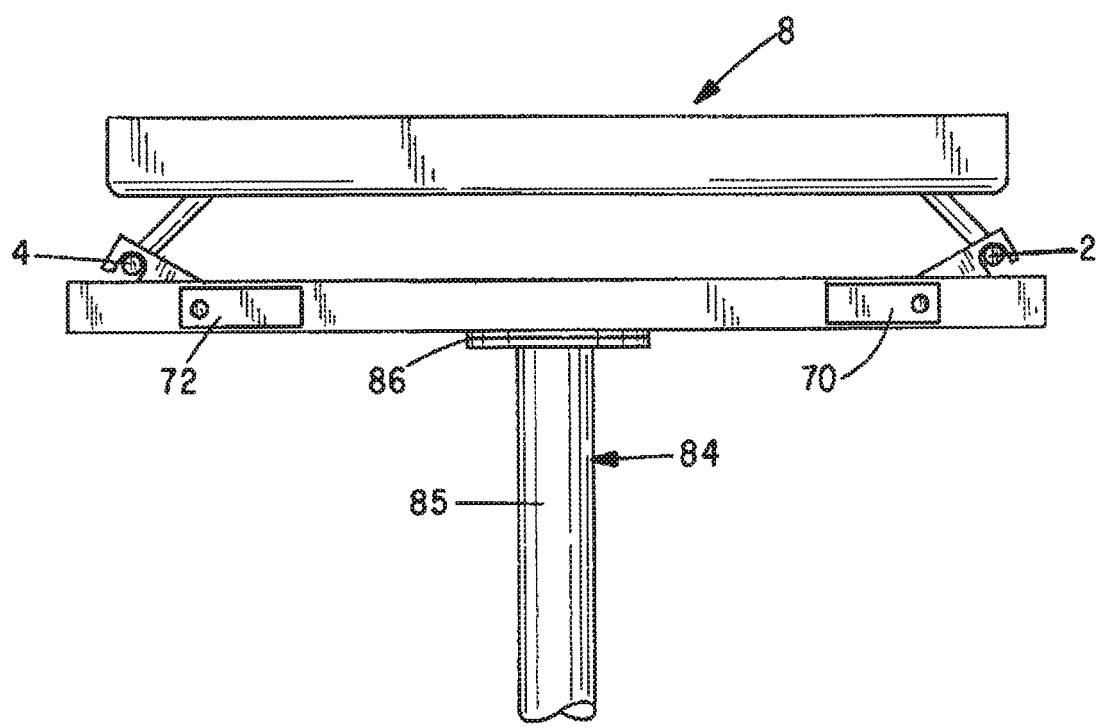
FIG. 8 is a side view showing the base of a grill attached to the universal mount of FIG. 7.
Figure 9:
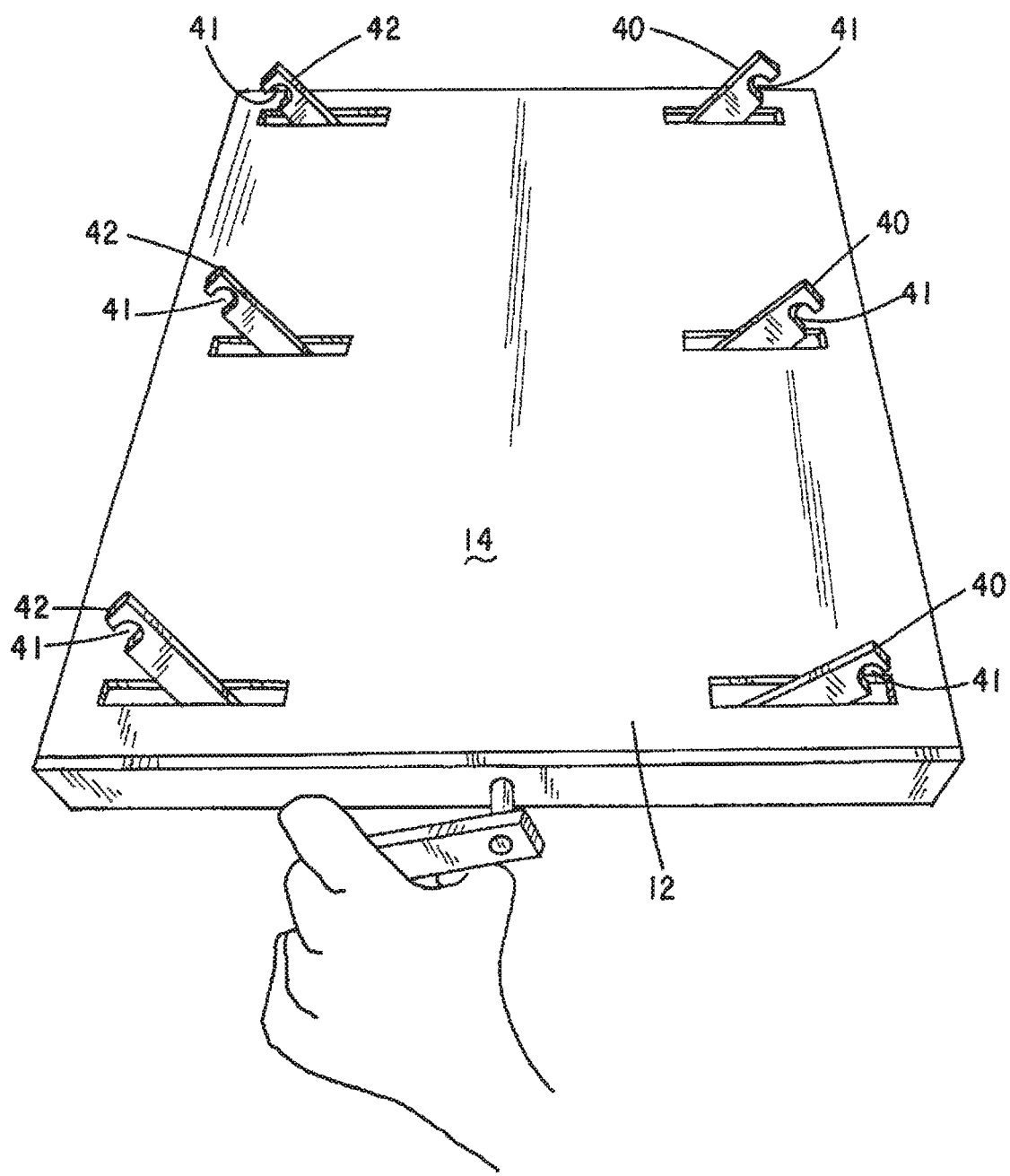
FIG. 9 is a perspective view of a third alternative embodiment of the universal mount.
Figure 10:
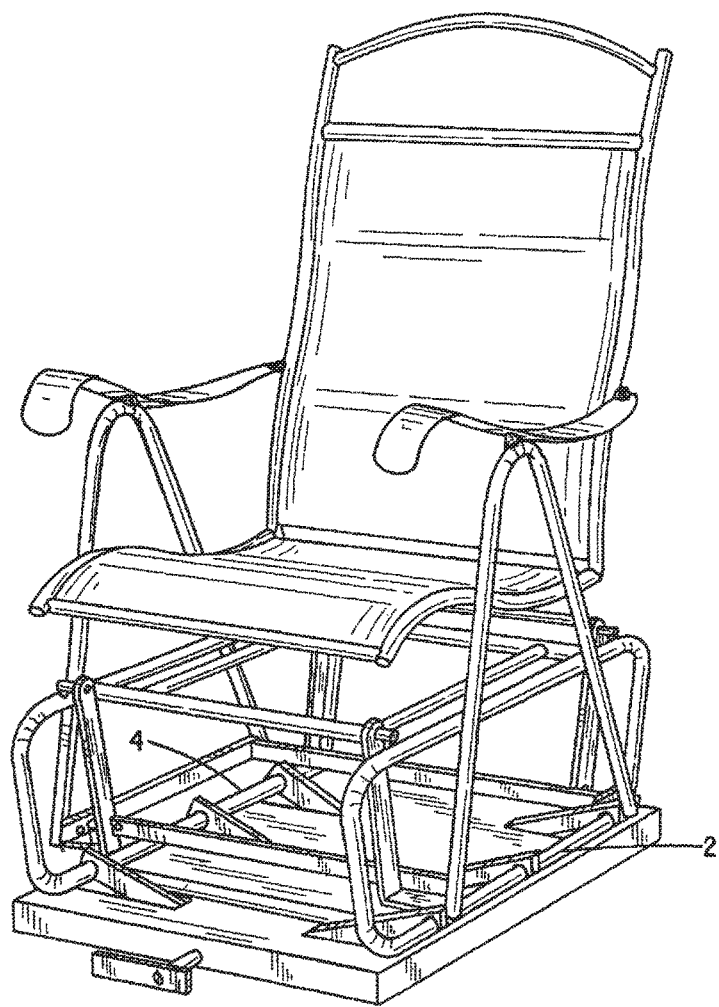
FIG. 10 is a perspective view of a chair coupled to the universal mount of FIG. 9.
Figure 11:
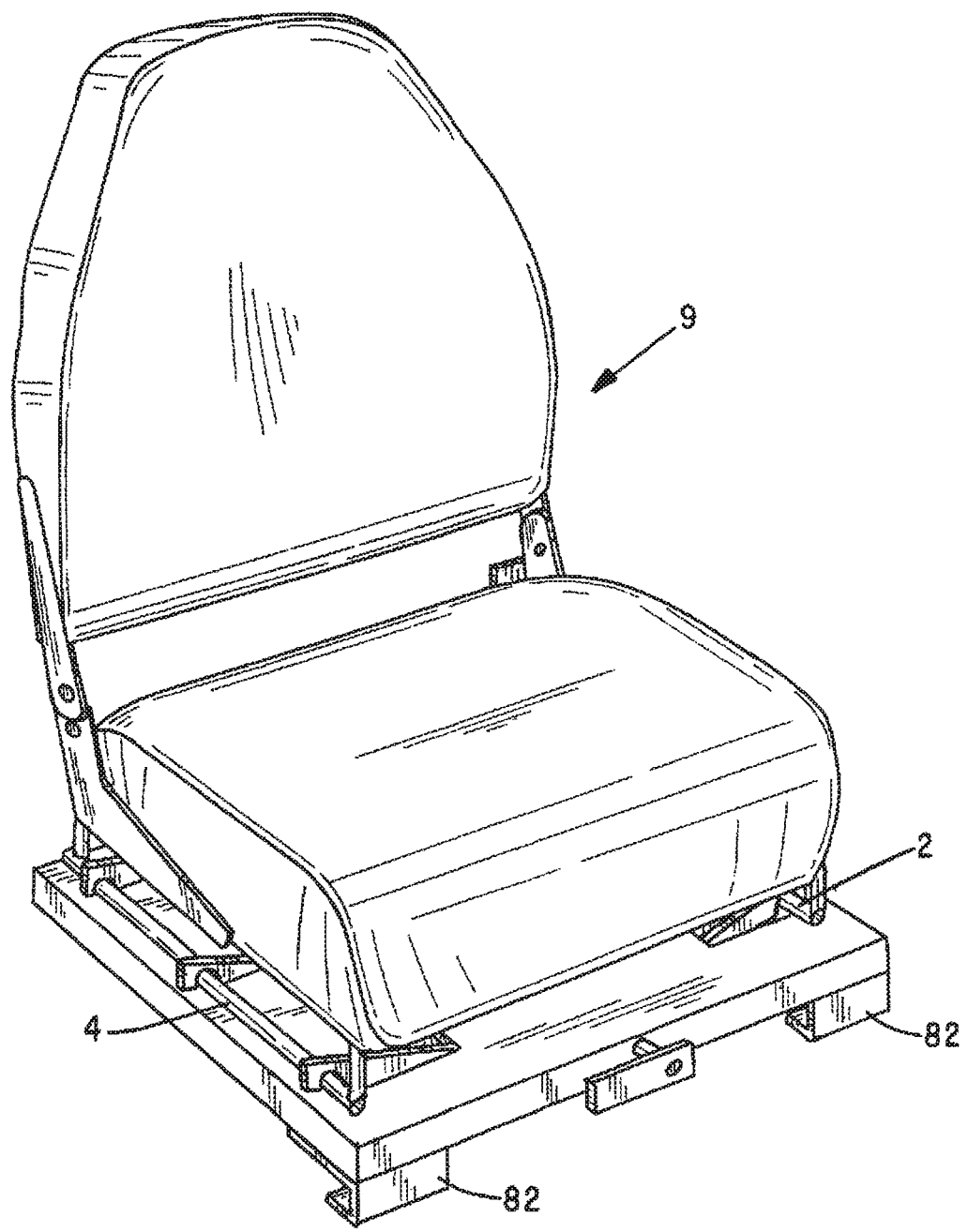
FIG. 11 shows a stadium seat mounted to a fourth alternative embodiment of the universal mount.

In the other embodiments shown in FIGS. 7-11 and 14, the latches 40/42 each have a hook-shaped end 41. This is best shown in FIG. 9. In these embodiments, the hook-shaped end and the top surface 14 of top plate 12 cooperate to latch braces 2 and 4 (or some similar structure) and thereby secure the item, such as a chair, shown in FIG. 10, a table 7 as shown in FIG. 7, a grill 8 as shown in FIG. 8 or a stadium chair 9 as shown in FIG. 11 to the quick release universal mount. In each case, the item to be attached has braces 2 and 4.

Various means may be employed to move the latches 40/42 between the stowed, latch and release positions. In some embodiments, elongate handles 70/72 are attached to the end of the axles 30/32. The handles 70/72 are used, for example, to manually apply enough force to overcome the force of spring 54, rotate the attached axle 30/32, and move the latches 40/42 into the release position. In other embodiments, locks or pins coupled to a handle 70/72 and to a mounting flange 28 may be employed to secure the associated axle 30/32 and the attached latches 40/42 in the latch position. See FIGS. 12 and 13. Unlocking the lock(s) 114 or removing the pin(s) 104 allows the handle 70/72, the axle 30/32 and the latches 40/42 to freely move from the latch position to the release position and from the release position to the stow position. The locks/locking pins may be employed in addition to the spring flanges 50/52 and spring 54 or instead of the spring flanges and spring.

The various embodiments of the quick release universal mount 10 may be attached to a floor, wall or other surface in any of a variety of ways. For example, the bottoms of the mounting flanges 28 can be placed in face-to-face registration with the surface to which the mount 10 is to be attached and bolts 17 extending through bolt holes in either the top plate 12 or mounting plates 51/52 and into the surface may be employed.

In some cases, it may be desirable to non-destructively attach the quick release universal mount 10 to a bench such as the bleachers of a stadium or gymnasium or the bench seat of a row boat. In such cases, releasable clamps 82 such as those shown in FIG. 11 may be employed.

In still other cases, and as shown in FIGS. 3, 6 and 7-8, the quick release universal mount 10 may be bolted to a pedestal 84. The pedestal 84 shown comprises a post 85 and a mounting plate 86 extending outwardly and perpendicularly from the top end of the post 85. The quick release universal mount 10 is bolted to the mounting plate 86 of pedestal 84. As shown in FIG. 6, the bottom end of the post can then be coupled to a socket 88 attached to the surface to which the assembly of the pedestal 84 and quick release mount 10 is to be coupled.

As noted above, the quick release universal mounted may be used to attach and secure a variety of items to a surface. For example, the quick release universal mount 10 may be used to secure the chairs shown in FIGS. 4-5 and 10 to any surface. After the mount 10 is secured to such a surface, latches 40 and 42 are moved from their stowed position to their release position. The braces 2 and 4 of the chair are then placed so they come to rest on the top surface 14 of top plate 12. In those embodiments having pockets, the brace 2 is positioned within the pocket 64 and brace 4 is positioned within pocket 65. The latches 40 and 42 are then moved (or permitted to move) into their latch positions thereby clamping the braces 2 and 4 to the quick release universal mount 10. When locks 114 or locking pins 104 are present, they are then deployed to prevent movement of the latches 40/42 from the latch position to the release position.

Whenever it is desirable to remove the chair 1 from mount 10, the process is reversed. Any locks 114 or locking pins 104 are disengaged and the latches 40/42 are moved from the latch position to the release position. The braces 2 and 4 are then lifted off the top surface 14 of the top plate 12 to separate the chair 1 from the mount 10. The latches 40/42 are then returned, or permitted to return, to their stowed position. Any locks or pins may then be reengaged to hold the latches 40/42 in the stowed position.

The quick release universal mount 10 may, of course, be used to secure items other than chairs to a surface. Any item having braces such as braces 2 and 4 or any other structure that can be latched in a similar fashion may be secured using the quick release mount 10. FIGS. 6-8 show various examples such as a table 7 and a grill 8, or a hammock stand 5.

Also, multiple quick release universal mounts 10 may be employed to secure longer items such as a hammock or seating for more than one person.

As illustrated in FIGS. 9-11, it may be desirable to have a single handle to move both sets of latches 40/42 between their respective latch, release and stowed positions. In such cases, the handle is coupled to a third center axle and an appropriate linkage is used to couple the center axle to the axles 30 and 32 such that rotation of the center axle serves to rotate axles 30 and 32.

As should be clear from the foregoing, quick release universal mounts made in accordance with the present invention are well-suited for outdoor use and around water, such as on a dock or pier. During sunny days, chairs, tables and other furniture, equipment and toys may be secured in place using mounts 10. When evening comes or the weather becomes inclement, such items can be quickly released from the mount and carried from the dock or pier to a storage location. Mounts 10 may also be employed on boats, swimming rafts and other watercraft.

Mounts 10 may be deployed for other purposes as well. Schools, for example, are moving toward "flexible furniture" arrangements. Such mounts can be used to mount and quickly change out seats in a school theater. Likewise, such mounts can be employed to install special seating and equipment for enhanced handicapped access in classrooms, cafeterias, auditoriums, gymnasiums, swimming pool areas and other athletic facilities.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. A quick release universal mount comprising:
 (a) a top plate having a top surface and a bottom surface, the top plate further comprising a plurality of latch perforations arranged in two spaced-apart opposing rows, each of said two spaced apart opposing rows comprising at least one of said plurality of latch perforations;
 (b) a first set of mounting flanges comprising first and second flanges extending from the bottom surface of the top plate and a second set of mounting flanges comprising third and fourth flanges extending from the bottom surface of the top plate;
 (c) a first latch carrying axle having a longitudinal axis, a first end coupled to the first flange and a second end coupled to the second flange and a second latch carrying axle having a longitudinal axis, a third end coupled to the third mounting flange and a fourth end coupled to the fourth flange, and wherein each of the first and second latch carrying axles, when so mounted, is adapted to rotate about said respective longitudinal axes of said first and second latch carrying axles
 (d) at least one first latch coupled to the first latch carrying axle and adapted to extend through a latch perforation of a first of said two spaced apart opposing rows of said plurality of latch perforations, said at least one first latch adapted to move between a latch position and a release position by rotation of the first latch carrying axle about the longitudinal axis of the first latch carrying axle;
 (e) at least one second latch coupled to the second latch carrying axle and adapted to extend through a latch perforation of a second of said two spaced apart opposing rows of said plurality of latch perforations, said at least one second latch adapted to move between a latch position and a release position by rotation of the second latch carrying axle about the longitudinal axis of the second longitudinal axis; and
 (f) a first spring attachment flange coupled to the first latch carrying axle, a second spring attachment flange coupled to the second latch carrying axle, and a spring coupled to the first and second spring attachment flanges so that the latches are only able to move from said latch positions respectively and their release position when sufficient rotational force is applied to at least one of the first and second latch carrying axles to overcome a force of the spring.

2. The quick release universal mount of claim 1 further comprising a lock adapted to hold said at least one first latch and said at least one second latch in said respective latch positions.

3. The quick release universal mount of claim 1 further comprising a pin adapted to hold said at least one first latch and said at least one second latch in said respective latch positions.

4. The quick release universal mount of claim 1 further comprising a first and second attachment members, said first attachment member is adapted to be captured by said at least one first latch when said at least one first latch is in said latch position and released when said at least one first latch is in said release position, and said second attachment member is adapted to be captured by said at least one second latch when said at least one second latch is in its said latch position and released when said at least second latch is in its release position.

5. The quick release universal mount of claim 4 wherein the first and second attachment members are adapted to be coupled to an item to be mounted using the quick release universal mount.

6. The quick release universal mount of claim 4 wherein an item is selected from a group consisting of a chair, a table, a hammock, a glider, a grill, a cooler, a diving platform, a winch, and a toy.

7. The quick release universal mount of claim 4 wherein the first and second attachment members are adapted to be permanently coupled to an item to be mounted using the quick release universal mount.

8. The quick release universal mount of claim 7 wherein the item is selected from a group consisting of a chair, a table, a hammock, a glider, a grill, a cooler, a diving platform, a winch, and a toy.

9. The quick release universal mount of claim 1 further comprising an attachment assembly adapted to couple the quick release universal mount to a support surface.

10. The quick release universal mount of claim 9 wherein the support surface is selected from a group consisting of a floor, a platform, and a wall.

11. The quick release universal mount of claim 9 wherein the attachment assembly comprises a post having a first end secured to the bottom surface of the top plate and a socket attached to the support surface and adapted to receive a second end of the post.

12. The quick release mount of claim 9 wherein the attachment assembly comprises at least one clamp.

13. The quick release mount of claim 9 wherein the attachment assembly comprises at least one bolt.

14. The quick release mount of claim 9 wherein the attachment assembly comprises at least one bracket.

15. A quick release universal mount comprising:
(a) a top plate having a top surface and a bottom surface, the top plate further comprising a plurality of latch perforations arranged in two spaced-apart opposing rows, each of said two spaced apart opposing rows comprising at least one of said plurality of latch perforations;
(b) a first set of mounting flanges comprising first and second flanges extending from the bottom surface of the top plate and a second set of mounting flanges comprising third and fourth flanges extending from the bottom surface of the top plate;
(c) a first latch carrying axle having a longitudinal axis, a first end coupled to the first flange and a second end coupled to the second flange and a second latch carrying axle having a longitudinal axis, a third end coupled to the third flange and a fourth end coupled to the fourth flange, and wherein each of the first and second latch carrying axles, when so mounted, is adapted to rotate about its longitudinal axis;
(d) at least one first latch coupled to the first latch carrying axle and adapted to extend through a latch perforation of a first of said two spaced apart opposing rows of latch perforations, said at least one first latch adapted to move between a latch position and a release position by rotation of the first latch carrying axle about its longitudinal axis;
(e) at least one second latch coupled to the second latch carrying axle and adapted to extend through a latch perforation of a second of said two spaced apart opposing rows of latch perforations, said at least one second latch adapted to move between a latch position and a release position by rotation of the second latch carrying axle about its longitudinal axis; and
(f) a retainer assembly adapted to selectively retain said at least one first latch its said latch position.

16. The quick release universal mount of claim 15, wherein said retainer assembly comprises a first spring attachment flange coupled to the first latch carrying axle and a spring coupled to the first and spring attachment flange so that the at least one first latch is only able to move from its said latch position to its release position when sufficient rotational force is applied to the first latch carrying axle to overcome a force of the spring.

17. The quick release universal mount of claim 15, wherein said retainer assembly is further adapted to selectively retain said at least one second latch in its said latched position.

18. The quick release universal mount of claim 15, wherein said retainer assembly is further adapted to selectively retain said at least one second latch in its latched position.

19. A quick release universal mount comprising:
(a) a top plate having a top surface and a bottom surface, the top plate further comprising a plurality of latch perforations arranged in two spaced-apart opposing rows, each of said two spaced apart opposing rows comprising at least one of said plurality of latch perforations;
(b) a first set of mounting flanges comprising first and second flanges extending from the bottom surface of the top plate and a second set of mounting flanges comprising third and fourth flanges extending from the bottom surface of the top plate;
(c) a first latch carrying axle having a longitudinal axis, a first end coupled to the first flange and a second end coupled to the second flange and a second latch carrying axle having a longitudinal axis, a third end coupled to the third flange and a fourth end coupled to the fourth flange, and wherein each of the first and second latch carrying axles, when so mounted, is adapted to rotate about its longitudinal axis;
(d) at least one first latch coupled to the first latch carrying axle and adapted to extend through a latch perforation of a first of said two spaced apart opposing rows of said plurality of latch perforations, said at least one first latch adapted to move between a latch position and a release position by rotation of the first latch carrying axle about its said longitudinal axis;
(e) at least one second latch coupled to the second latch carrying axle and adapted to extend through a latch perforation of a second of said two spaced apart opposing rows of latch perforations, said at least one second latch adapted to move between a latch position and a release position by rotation of the second latch carrying axle about its longitudinal axis;
(f) a retainer assembly adapted to selectively retain said at least one first latch in its said latched position, and
(g) an attachment assembly adapted to couple the quick release universal mount to a support surface.

* * * * *